Patented Apr. 10, 1923.

1,451,666

UNITED STATES PATENT OFFICE.

STUART P. MILLER, OF PHILADELPHIA, PENNSYLVANIA, ASSIGNOR TO THE BARRETT COMPANY, A CORPORATION OF NEW JERSEY.

PRODUCTION OF ALPHA-NAPHTHYLAMINE.

No Drawing.    Application filed October 2, 1919. Serial No. 328,054.

*To all whom it may concern:*

Be it known that I, STUART P. MILLER, a citizen of the United States, residing at Philadelphia, in the county of Philadelphia and State of Pennsylvania, have invented certain new and useful Improvements in the Production of Alpha-Naphthylamine, of which the following is a specification.

This invention relates to an improvement in the process of producing alpha-naphthylamine. It relates more particularly to the separation of the alpha-naphthylamine from the iron oxide which is obtained as a by-product from the customary process for the manufacture of alpha-naphthylamine.

In the well-known and previously employed process for the manufacture of alpha-naphthylamine the customary procedure has been as follows: Naphthalene was nitrated to mono-nitro-naphthalene by treating it with the required amount of nitric acid in the presence of the required amount of sulphuric acid, of the required concentration. The alpha-mono-nitro-naphthalene was substantially freed from the sulphuric acid, and was then reduced to alpha-naphthylamine by treating it with iron (preferably in the form of iron borings or shavings) and an acid (preferably hydrochloric acid). The alpha-naphthylamine produced by this reduction was mixed with a relatively large amount of iron oxide formed as a by-product in the reaction, and with a relatively small amount of unoxidized iron. The mixture of alpha-naphthylamine, iron oxide and iron was then heated in a closed apparatus to distill off the alpha-naphthylamine, which was condensed and again distilled in order to obtain a substantially pure product.

During the heating of the mixture of alpha-naphthylamine, iron oxide and iron for the purpose of distilling off the alpha-naphthylamine considerable decomposition of the alpha-naphthylamine occurs due to the high temperature required, and a considerable amount of valuable material is thereby lost. Moreover, where a still is used the heavy iron oxide and iron tends to settle to the bottom of the still, forming a thick mass of material which conducts heat poorly, and tends to cause the still body to warp and crack. Also the operation of distilling the alpha-naphthylamine from the iron oxide is very unpleasant and dangerous.

My invention relates to the separation of the alpha-naphthylamine from the iron oxide and unoxidized iron by dissolving the alpha-naphthylamine in a solvent, and separating the undissolved iron and iron oxide by filtration or other suitable means.

One of the objects of my invention is to increase the yield of alpha-naphthylamine by dispensing with the distillation of the alpha-naphthylamine from the iron oxide and iron, thereby avoiding the losses incident to this distillation.

Another object of my invention is to eliminate the serious expense incident to the mechanical operation of the apparatus for the distillation of the alpha-naphthylamine from the iron oxide and unoxidized iron.

In the process as heretofore practiced extremely disagreeable and poisonous fumes were generated during the distillation of the alpha-naphthylamine from the mixture of iron oxide and iron. The residual iron oxide and iron remained as a very fine dust which was extremely difficult and dangerous to handle at the high temperature necessitated by the operation. It is one of the objects of this invention to eliminate the disagreeable and dangerous fumes and dust incident to the operation as heretofore practiced.

In carrying out this invention naphthalene is treated with nitric acid in the usual way to form alpha-mono-nitro-naphthalene. The alpha-mono-nitronaphthalene is then reduced to alpha-naphthylamine by treating it with iron in the presence of an acid, preferably hydrochloric acid. This reaction produces iron oxide which remains mixed with the crude alpha-naphthylamine and the unoxidized iron. Instead of attempting to distill off the alpha-naphthylamine from the mixture, as heretofore done, the mixture is treated with a solvent which will dissolve the alpha-naphthylamine. Refined solvent naphtha has been found suitable for this purpose. A sufficient amount of solvent naphtha is used to make a solution consisting of about equal parts of naphtha and alpha-naphthylamine while the temperature is maintained at approximately 60° C.

The undissolved material (iron oxide and unoxidized iron) is then separated from the solution by a suitable means; as, for example, by filtering through a filter press, or by centrifuging in a centrifugal machine, or by settling. In practicing this invention I prefer to separate the undissolved material by filtering through a filter press.

The filtrate, which consists of the alpha-naphthylamine in solution in the solvent naphtha, is then distilled to remove the naphtha. This may be done in a steam heated still leaving as a residue the crude alpha naphthylamine. This alpha-naphthylamine may be further refined by any of the well known processes.

The iron oxide and iron remaining in the filter press is washed with solvent naphtha to clear the same of alpha-naphthylamine, by pumping naphtha through the filter press. Solvent remaining in the press may afterwards be removed from the mixture of iron oxide and iron by steam distillation, vacuum drying, or in any other convenient way, so that the oxide and iron is thus rendered substantially free of alpha-naphthylamine and solvent, but is left sufficiently moist to facilitate handling the same without disagreeable dusting of the oxide.

The solvent recovered by distilling the alpha-naphthylamine solution and that used in washing the oxide may be used again in the process, as a solvent for alpha-naphthylamine.

It is my intention not to limit the scope of this application to the manufacture of pure alpha-naphthylamine, but to include also the manufacture of that product which is known in the arts as alpha-naphthylamine and which consists essentially of the chemical compound alpha-naphthylamine, together with small amounts of beta-naphthylamine and other impurities commonly present in the commercial product.

I claim:

1. The method of producing alpha-naphthylamine which comprises nitrating naphthalene, reducing the nitro compound with iron in the presence of an acid, adding solvent naphtha, filtering and distilling.

2. The method of producing alpha-naphthylamine which comprises nitrating naphthalene, reducing the nitro compound with iron in the presence of an acid, adding solvent naphtha while maintaining the temperature at substantially 60° C., filtering and distilling.

In testimony whereof I affix my signature.

STUART P. MILLER.